United States Patent
Attard et al.

(10) Patent No.: US 9,903,334 B2
(45) Date of Patent: Feb. 27, 2018

(54) LOW SPEED PRE-IGNITION KNOCK DETECTION

(71) Applicants: William P Attard, Brighton, MI (US); Philipp A Seyfried, Rochester, MI (US)

(72) Inventors: William P Attard, Brighton, MI (US); Philipp A Seyfried, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 44 days.

(21) Appl. No.: 15/150,796

(22) Filed: May 10, 2016

(65) Prior Publication Data
US 2017/0328333 A1 Nov. 16, 2017

(51) Int. Cl.
*F02P 5/00* (2006.01)
*F02P 5/152* (2006.01)
*F02D 35/02* (2006.01)
*F02D 41/14* (2006.01)
*F02P 17/12* (2006.01)

(52) U.S. Cl.
CPC ............ *F02P 5/152* (2013.01); *F02D 35/027* (2013.01); *F02D 35/028* (2013.01); *F02D 41/1498* (2013.01); *F02P 17/12* (2013.01); *F02P 2017/128* (2013.01)

(58) Field of Classification Search
CPC ... F02D 37/02; F02P 5/14; F02P 5/152; F02P 5/1525; F02P 5/00; F02P 5/045
USPC ............ 123/406.11, 406.21, 406.24, 406.29, 123/406.34
See application file for complete search history.

(56) References Cited

U.S. PATENT DOCUMENTS 5,594,649 A * 1/1997 Cook .................... G01L 23/225
123/406.37
5,905,193 A 5/1999 Hashizume et al.
(Continued)

FOREIGN PATENT DOCUMENTS

DE 29722031 U1 4/1999
DE 102016115157 A1 2/2017
WO 2014064099 A2 5/2014

OTHER PUBLICATIONS

William P. Attard, Elisa Toulson, Harry Watson and Ferenc Hamori; Abnormal Combustion Including Mega Knock in a 60% Downsized Highly Turbocharged PFI Engine; SAE International, May 5, 2010, ISSN 0148-7191; doi:10.4271/2010-01-1456, USA, 17 pages.
(Continued)

*Primary Examiner* — John Kwon
(74) *Attorney, Agent, or Firm* — Ralph E Smith

(57) ABSTRACT

A system for and a method of knock detection and control for an engine utilizes a knock sensor configured to generate a knock signal indicative of a vibration of the engine caused by abnormal combustion. A controller is configured to receive the knock signal, determine, with respect to a crank angle of the engine, distinct monitoring windows for low speed pre-ignition (LSPI) knock and spark knock, respectively, based on (i) spark timing and (ii) an appropriate mass fraction burn (MFB) location, monitor the knock signal using the distinct monitoring windows, detect one of LSPI knock and spark knock based on the monitoring, and control the engine to mitigate the detected LSPI knock or spark knock.

16 Claims, 3 Drawing Sheets

(56) References Cited

U.S. PATENT DOCUMENTS

| | | | |
|---|---|---|---|
| 6,118,276 | A | 9/2000 | Nakata et al. |
| 6,615,811 | B1 | 9/2003 | Butler |
| 6,883,497 | B2 | 4/2005 | Wozniak et al. |
| 7,533,651 | B2 | 5/2009 | Sumilla |
| 8,245,692 | B2 | 8/2012 | Glugla et al. |
| 8,438,906 | B2 | 5/2013 | Heinzelmann |
| 8,720,416 | B2 | 5/2014 | Amann et al. |
| 8,731,799 | B2 | 5/2014 | Makino et al. |
| 8,973,429 | B2 | 3/2015 | Gwidt et al. |
| 9,080,521 | B2 | 7/2015 | Amann et al. |
| 2009/0078234 | A1* | 3/2009 | Barrett ............... F02P 5/1522 123/406.37 |
| 2011/0139118 | A1 | 6/2011 | Glugla et al. |
| 2012/0186225 | A1* | 7/2012 | Amann ............... F02D 35/028 60/274 |
| 2014/0000552 | A1 | 1/2014 | Glugla et al. |
| 2015/0159573 | A1 | 6/2015 | Glugla et al. |
| 2016/0369762 | A1* | 12/2016 | Hakeem .............. F02P 5/045 |
| 2017/0030321 | A1* | 2/2017 | Glugla ............... F02P 5/1455 |
| 2017/0051688 | A1* | 2/2017 | Glugla ............... F02D 41/0087 |

OTHER PUBLICATIONS

International Search Report and Written Opinion dated Aug. 1, 2017 for International Application No. PCT/US2017/027123, International Filing Date Apr. 12, 2017.

* cited by examiner

LOW SPEED PRE-IGNITION KNOCK DETECTION

FIELD

The present application generally relates to engine knock detection and, more particularly, to techniques for low speed pre-ignition (LSPI) knock detection.

BACKGROUND

Internal combustion engines combust an air/fuel mixture within cylinders to drive pistons that rotatably turn a crankshaft to generate drive torque. Abnormal combustion of the air/fuel mixture can cause vibration of the engine (e.g., seismic waves through the engine structure), which is known as "knock." There are two primary types of engine knock: (1) end-gas auto ignition (also known as "spark knock") and (2) low speed pre-ignition (LSPI) knock (also known as "mega knock"). LSPI knock refers to a stochastic, abnormal start of combustion prior to spark discharge. Specifically, oil ingestion or chemical pre-reactions due to time, pressure, and temperature may cause auto-ignition, which creates pressure waves that collide causing knock.

LSPI knock is often orders of magnitude higher than spark knock. A typical knock control strategy is spark retardation. This control strategy, however, is not effective against LSPI knock and is actually detrimental in mitigating LSPI knock. This is because during LSPI knock, combustion has already been initiated prior to the spark discharge, and thus retardation of the spark timing provides the cylinder charge even more time for auto-ignition to occur. Accordingly, while such knock detection and control systems work for their intended purpose, there remains a need for improvement in the relevant art.

SUMMARY

According to a first aspect of the invention, a knock detection and control system is presented. In one exemplary implementation, the system includes a knock sensor configured to generate a knock signal indicative of a vibration of the engine caused by abnormal combustion and a controller configured to: receive the knock signal, determine, with respect to a crank angle of the engine, distinct monitoring windows for low speed pre-ignition (LSPI) knock and spark knock, respectively, based on (i) spark timing and (ii) an appropriate mass fraction burn (MFB) location, monitor the knock signal using the distinct monitoring windows, detect one of LSPI knock and spark knock based on the monitoring, and control the engine to mitigate the detected LSPI knock or spark knock.

According to a second aspect of the invention, a knock detection and control method is presented. In one exemplary implementation, the method includes receiving, by a controller and from a knock sensor of the engine, a knock signal indicative of a vibration of the engine caused by abnormal combustion, determining, by the controller and with respect to a crank angle of the engine, distinct monitoring windows for LSPI knock and spark knock, respectively, based on (i) spark timing and (ii) an appropriate mass fraction burn (MFB) location, monitoring, by the controller, the knock signal using the distinct monitoring windows, detecting, by the controller, one of LSPI knock and spark knock based on the monitoring, and controlling, by the controller, the engine to mitigate the detected LSPI knock or spark knock.

In some implementations, the LSPI knock monitoring window is positioned before the appropriate MFB location and the spark knock monitoring window is positioned after the appropriate MFB location. In some implementations, the LSPI and spark knock monitoring windows are separated by a controller reset window. In some implementations, the controller is configured to reset its signal amplifications and detection thresholds during the controller reset window. In some implementations, each distinct monitoring window has distinct signal amplifications and detection thresholds associated therewith.

In some implementations, the engine is a direct injection (DI) engine, and wherein the controller is configured to mitigate the detected LSPI knock by controlling DI fuel injectors of the engine. In some implementations, the controller is configured to further mitigate the detected LSPI knock by controlling airflow into the engine. In some implementations, the controller is configured to further mitigate the detected LSPI knock by limiting or decreasing a torque output of the engine. In some implementations, the controller is configured to mitigate the detected spark knock by performing spark retardation.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously mentioned, conventional spark retardation is detrimental in mitigating low speed pre-ignition (LSPI) knock. One LSPI knock detection technique involves utilizing an ionization current sensor on an ignition coil (also known as "ion sensing"). This technique, however, is both costly (due to the additional sensor) and unreliable. Accordingly, systems and methods for improved knock detection and control are presented. The techniques implemented by these systems and methods are capable of distinguishing between conventional spark knock and LSPI knock using an engine's knock sensor. More particularly, a knock signal generated by the knock sensor is monitored using two distinct monitored windows for LSPI knock and spark knock, respectively. In some implementations, each monitoring window has its own associated signal amplifications and detection thresholds. LSPI mitigation can also involve controlling different actuators (DI fuel injectors, throttle, etc.) to mitigate detected LSPI knock.

Figure 1:
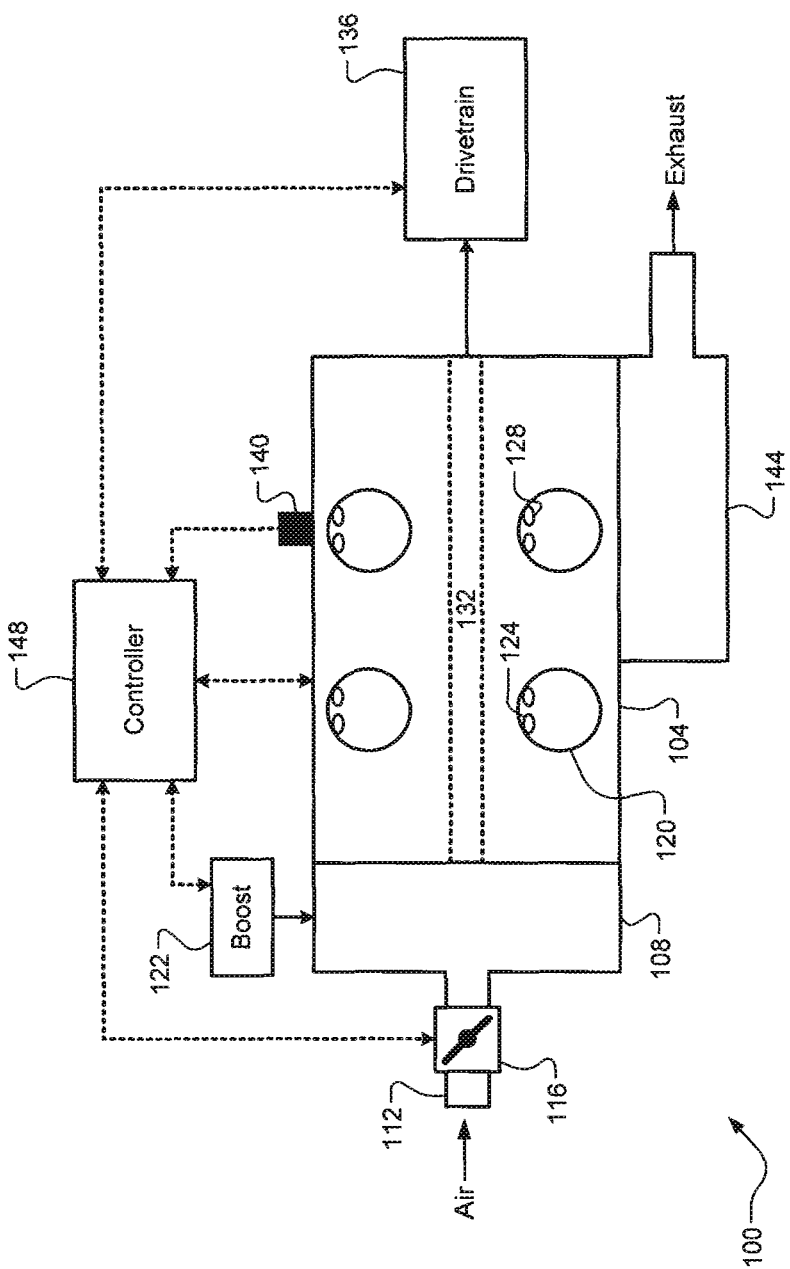
FIG. 1 is a diagram of an example engine system according to the principles of the present disclosure.

Referring now to FIG. 1, a diagram of an example engine system 100 is illustrated. The engine system 100 includes an engine 104 configured to combust an air/fuel mixture to generate drive torque. Non-limiting examples of the engine 104 include a spark ignition direct injection (SIDI) engine, but it will be appreciated that the techniques of the present disclosure could be applicable to any suitable engine comprising a knock sensor, such as a port fuel injection (PFI) engine. In some implementations, the engine 104 could be a gasoline compression ignition engine (homogeneous charge compression ignition (HCCI), partially pre-mixed charge compression ignition (PPCI), pre-mixed charge compression ignition, etc.). The engine 104 draws air into an intake manifold 108 through an induction system 112 that is selectively regulated by a throttle valve 116. The air in the intake manifold 108 is distributed to a plurality of cylinders 120 and therein combined with fuel injected by respective DI fuel injectors 124. While four cylinders are shown, it will be appreciated that the engine 100 could have any suitable number of cylinders. In some implementations, the engine 104 includes a boost system 122 (a turbocharger, a supercharger, etc.).

The air/fuel mixture in the cylinders 120 is compressed by pistons (not shown) and combusted by spark generated by respective spark plugs 128. For a smaller (e.g., 4 cylinder) configuration of the engine 104 with the boost system 122, a compression ratio of the cylinders 120 may be relatively high. The combustion of the air/fuel mixture within the cylinders 120 drives the pistons (not shown), which rotatably turn a crankshaft 132 to generate drive torque. The drive torque is then transferred, e.g., via a transmission (not shown), to a drivetrain 136. A knock sensor 140 is configured to generate a knock signal indicative of vibration of the engine 104 caused by abnormal combustion. In one exemplary implementation, the knock sensor 140 is an accelerometer-based sensor that is mounted to a block of the engine 104. The abnormal combustion, if unaccounted for, causes noticeable vibrations (noise, vibration, and/or harshness, or NVH) and/or could damage the engine 104. While one knock sensor 140 is illustrated and discussed herein, it will be appreciated that the engine 104 could include a plurality of distinct knock sensors (one knock sensor per cylinder bank or group of cylinders, one knock sensor per cylinder, etc.).

Exhaust gas resulting from combustion is expelled from the cylinders 120 into an exhaust system 144 configured to treat the exhaust gas before releasing it into the atmosphere. For example, unburnt fuel from the abnormal combustion could cause increase emissions that must then be handled by the exhaust system 144. A controller 148 (an application-specific integrated circuit (ASIC), one or more processors and a non-transitory memory storing executable instructions, etc.) controls operation of the engine system 100, such as controlling the throttle valve 116 (airflow), the DI fuel injectors 124 (fuel), and the spark plugs 128 (spark). The controller 148 also receives the knock signal from the knock sensor 140. The controller 148 is configured to detect knock of the engine 104 using the knock signal. According to the techniques of the present disclosure, the controller 148 is configured to detect both (i) LSPI knock and (ii) spark knock using the knock signal, which will be described in greater detail below. While not shown, it will be appreciated that the controller 148 is configured to receive other inputs, such as a crank angle measurement (e.g., in crank angle degrees, or CAD) from a crankshaft position sensor (not shown).

Causes of LSPI events are numerous. Extended and reoccurring LSPI can lead to thermal runways and surface (cylinder wall) ignition. Possible causes of LSPI events include: (1) hot combustion chamber deposits that flake off and ignite the cylinder charge because the flaking deposit is exposed to long resonance times and elevated pressure, which causes it to ignite, (2) oil droplets from the piston crevice enter into the combustion chamber of the cylinder 120 and act as a localized octane reducer causing auto-ignition prior to the spark discharge, and (3) auto-ignition prior to the spark discharge due to the boundary conditions, such as in gasoline compression ignition engines. Some engines overcome these surface ignition problems with improved hardware, engine design, and calibration. LSPI events, however, are still problematic in boosted engines with very retarded combustion phasing and high combustion ratios (long resonance times at elevated pressure) operating at low speed and high load.

For a particular monitoring window, the knock signal is processed according to associated parameters (signal amplifications, detection thresholds, etc.). In one exemplary implementation, the knock signal is filtered, rectified, and its energy is integrated across the monitoring window to obtain a single value. The window could be calibrated throughout the engine speed range. Based on a fast Fourier transform (FFT), the "knocking frequency" is isolated, which allows monitoring of first and second order pressure oscillations occurring in a particular frequency range (e.g., 5-10 kilohertz (kHz)). As previously discussed herein, only one monitoring window is typically active at a time. Before a new window is active, there may be a reset period for the controller 148. Thus, by implementing two distinct monitoring windows separated by a controller reset window, a single controller 148 is capable of detecting both LSPI knock and spark knock using a single knock sensor 140.

Figure 2:
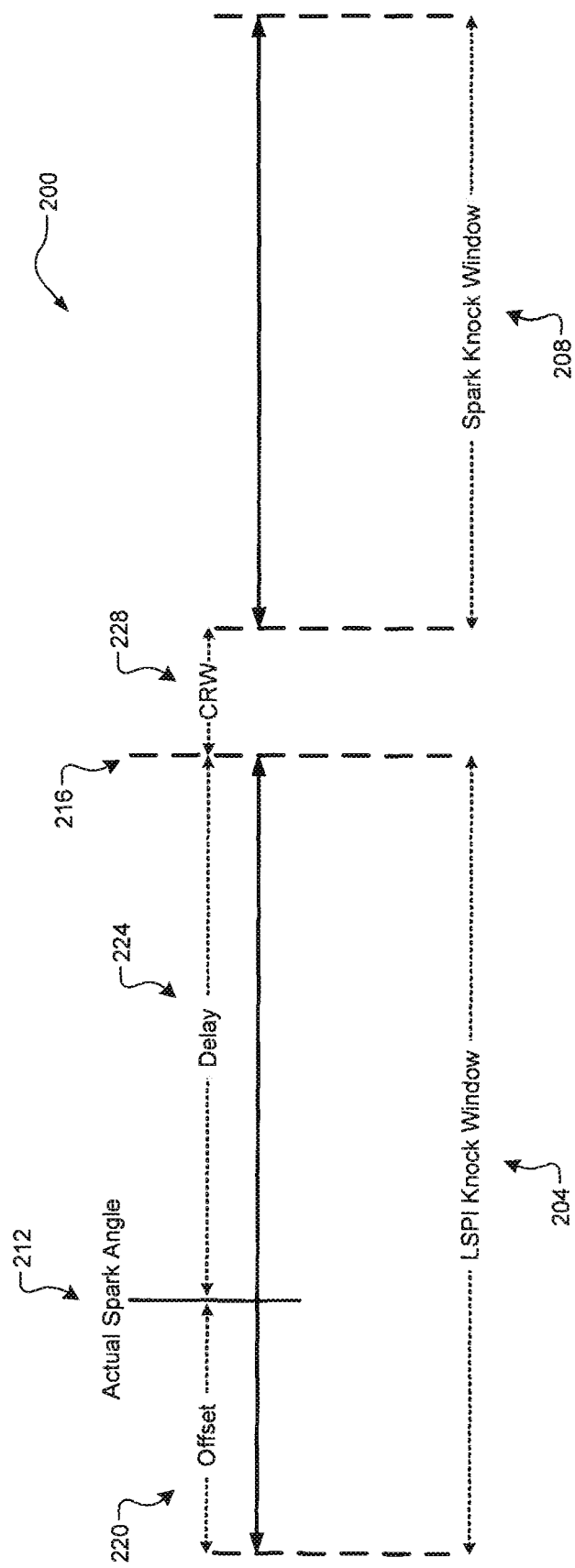
FIG. 2 is timing diagram of example monitoring windows for a knock signal according to the principles of the present disclosure.

Referring now to FIG. 2, a timing diagram 200 of example monitoring windows 204, 208 for a knock signal received from the knock sensor 140 is illustrated. The timing diagram 200 corresponds to a combustion event (i.e., a combustion stroke) of a particular cylinder 120, but it will be appreciated that spark knock monitoring could extend into an expansion stroke of the cylinder 120 as described in greater detail below. As shown, the monitoring windows 204, 208 are determined with respect to actual spark angle 212 and an appropriate mass fraction burn (MFB) location 216. This appropriate MFB location could be a 50% MFB location (also known as "CA50"), as opposed to with respect to engine top dead center (TDC). It will be appreciated however, that the appropriate MFB location may not be the 50% location (i.e., it could be before or after the 50% MFB location). The term "actual spark angle" refers to a crankshaft angle/position at which the spark occurs. This is a known/scheduled value for the controller 148. Conventional knock detection, in comparison, utilizes a single monitoring window, which is fixed for every particular engine speed. As shown, the LSPI knock window 204 is positioned before the appropriate MFB location 216 and the spark knock window 208 is positioned after the appropriate MFB location 216. This is because LSPI heat release and resultant cylinder pressure oscillations happen earlier in the engine cycle compared to spark knock.

In one exemplary implementation, the following durations/offsets/delays for determining/positioning the monitoring windows 204, 208 are obtained using predetermined lookup tables stored at the controller 148. From the actual spark angle 212, the LSPI knock window 204 is determined to be from (i) an offset value 220 before the actual spark angle 212 until (ii) a delay 224 from the actual spark angle until the appropriate MFB location, plus or minus a tolerance. A controller reset window ("CRW") 228 is positioned between the LSPI knock window 204 and the spark knock window 208. The length of the controller reset window 228 is calibrated such that it is long enough for a worst-case reset of the controller 148 to load parameters (signal amplifications, detection thresholds, etc.) for the spark knock window 208. The spark knock window 208 then extends from an end of the controller reset window 228 into an expansion stroke of the cylinder 120 (i.e., after an end of a combustion stroke of the cylinder 120). The spark knock window 208 could also be described as extending until the end of combustion, plus a safety margin. By extending the spark knock window 208 into the expansion stroke of the cylinder 120, late/extended spark knock ringing is able to be monitored. Subsequent control to mitigate/suppress the detected LSPI knock and/or the detected spark knock is described in greater below.

Figure 3:
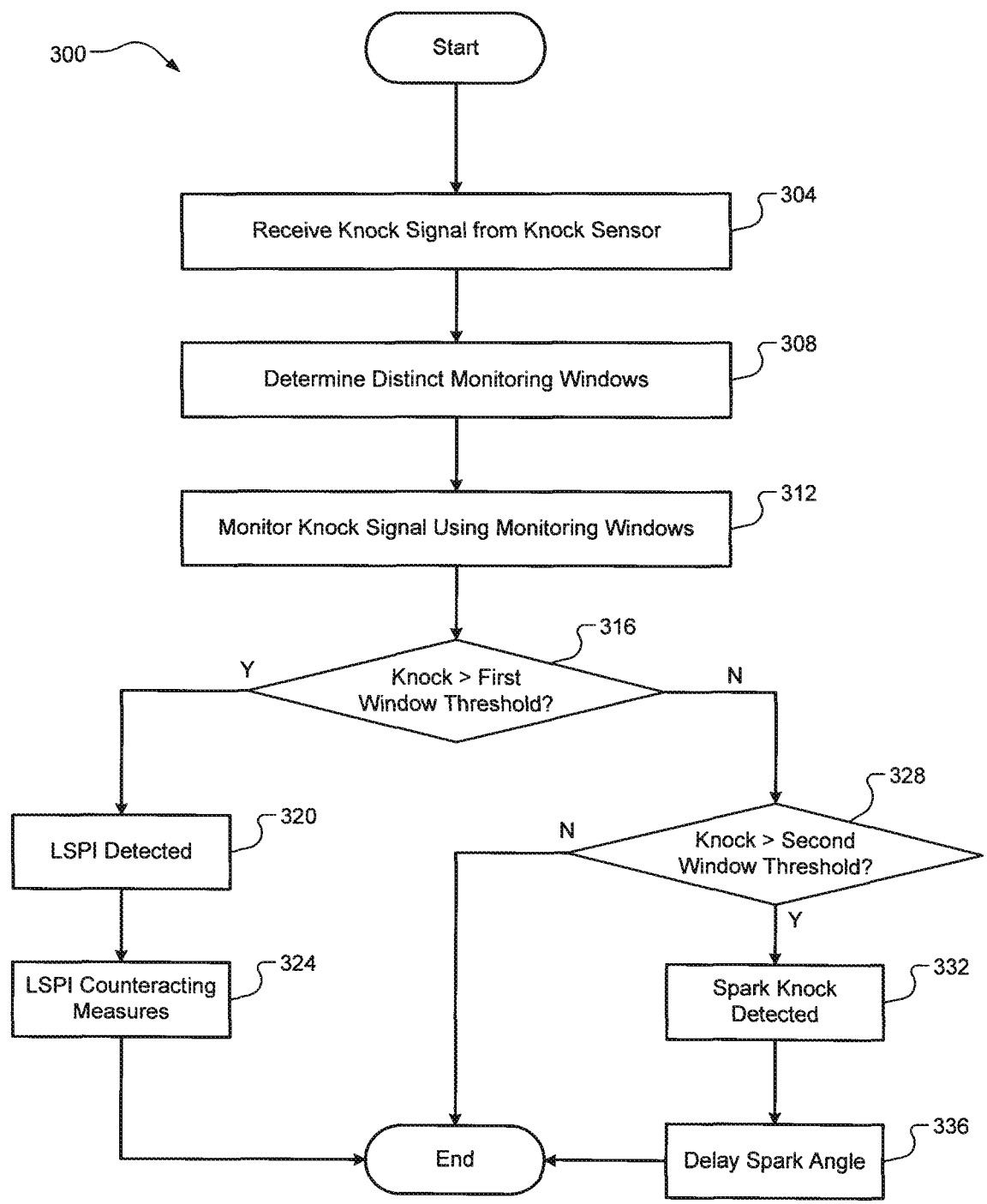
FIG. 3 is a flow diagram of an example knock detection and control method according to the principles of the present disclosure.

Referring now to FIG. 3, a flow diagram of an example knock detection and control method 300 is illustrated. At 304, the controller 148 receives, from the knock sensor 140 of the engine 104, a knock signal indicative of a vibration of the engine 104 caused by abnormal combustion. At 308, the controller 148 determines distinct monitoring windows for LSPI knock and spark knock, respectively. As previously discussed herein, this could be based on current spark angle, a delta to a maximum brake torque (MBT) spark timing, and the duration of the CRW 228 (i.e., a controller reset time). At 312, the controller 148 monitors the knock signal using the distinct monitoring windows. As previously discussed herein, this involves utilizing distinct signal amplifications and detection thresholds for LSPI knock and spark knock, respectively. At 316, the controller 148 determines whether knock exceeding a threshold is detected in the LSPI knock window 204. If true, the method 300 proceeds to 320 where LSPI knock is detected. If false, the method 300 proceeds to 328. At 324, the controller 148 implements LSPI counteracting measures, such as those discussed previously herein and in further detail below. The method 300 then ends or returns to 304. At 328, the controller 148 determines whether knock exceeding a threshold is detected within the spark knock window 208. If true, the controller 148 detects spark knock at 332. At 336, the controller 148 mitigates the spark knock by delaying or retarding spark timing. The method 300 then ends or returns to 304.

For detected spark knock, for example, the controller 148 could perform spark retardation. For detected LSPI knock, on the other hand, the controller 148 could utilize other torque control actuators (e.g., airflow and/or fuel control actuators). In one exemplary implementation, one or more of the following torque control techniques could be utilized to mitigate the detected LSPI knock. A first attempt could be made by the controller 148 to mitigate the detected LSPI knock by controlling the DI fuel injectors 124, which represent a fast path for torque control. A subsequent (second) or alternative attempt could be made by the controller 148 to mitigate the detected LSPI knock by controlling the throttle 116, which represents a short-term slow path for torque control. A subsequent (third) or alternative attempt could be made by the controller 148 to mitigate the detected LSPI knock by limiting or decreasing engine torque output (e.g., an incoming torque request), which represents a long-term slow path for torque control.

As previously discussed, it will be appreciated that the term "controller" as used herein refers to any suitable control unit configured to perform at least a portion of the techniques of the present disclosure. Examples include an ASIC, one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A knock detection and control system for an engine, the system comprising:
   a knock sensor configured to generate a knock signal indicative of a vibration of the engine caused by abnormal combustion; and
   a controller configured to:
   receive the knock signal,
   determine, with respect to a crank angle of the engine, distinct monitoring windows for low speed pre-ignition (LSPI) knock and spark knock, respectively, based on (i) spark timing and (ii) an appropriate mass fraction burn (MFB) location,
   monitor the knock signal using the distinct monitoring windows,
   detect one of LSPI knock and spark knock based on the monitoring, and
   control the engine to mitigate the detected LSPI knock or spark knock,
   wherein the engine is a direct injection (DI) engine, and wherein the controller is configured to mitigate the detected LSPI knock by controlling DI fuel injectors of the engine.

2. The system of claim 1, wherein the LSPI knock monitoring window is positioned before the appropriate MFB location and the spark knock monitoring window is positioned after the appropriate MFB location.

3. The system of claim 2, wherein the LSPI and spark knock monitoring windows are separated by a controller reset window.

4. The system of claim 3, wherein the controller is configured to reset its signal amplifications and detection thresholds during the controller reset window.

5. The system of claim 4, wherein each distinct monitoring window has distinct signal amplifications and detection thresholds associated therewith.

6. The system of claim 1, wherein the controller is configured to further mitigate the detected LSPI knock by controlling airflow into the engine.

7. The system of claim 6, wherein the controller is configured to further mitigate the detected LSPI knock by limiting or decreasing a torque output of the engine.

8. The system of claim 1, wherein the controller is configured to mitigate the detected spark knock by performing spark retardation.

9. A method of knock detection and control for an engine, the method comprising:
   receiving, by a controller and from a knock sensor of the engine, a knock signal indicative of a vibration of the engine caused by abnormal combustion;
   determining, by the controller and with respect to a crank angle of the engine, distinct monitoring windows for low speed pre-ignition (LSPI) knock and spark knock, respectively, based on (i) spark timing and (ii) an appropriate mass fraction burn (MFB) location;

monitoring, by the controller, the knock signal using the distinct monitoring windows;

detecting, by the controller, one of LSPI knock and spark knock based on the monitoring; and controlling, by the controller, the engine to mitigate the detected LSPI knock or spark knock, wherein the engine is a direct infection (DI) engine, and wherein the mitigating of the detected LSPI knock is performed by controlling DI fuel injectors of the engine.

10. The method of claim 9, wherein the LSPI knock monitoring window is positioned before the appropriate MFB location and the spark knock monitoring window is positioned after the appropriate MFB location.

11. The method of claim 10, wherein the LSPI and spark knock monitoring windows are separated by a controller reset window.

12. The method of claim 11, further comprising resetting, by the controller, its signal amplifications and detection thresholds during the controller reset window.

13. The method of claim 12, wherein each distinct monitoring window has distinct signal amplifications and detection threshold associated therewith.

14. The method of claim 9, further comprising further mitigating, by the controller, the detected LSPI knock by controlling airflow into the engine.

15. The method of claim 14, further comprising further mitigating, by the controller, the detected LSPI knock by limiting or decreasing a torque output of the engine.

16. The method of claim 14, wherein the mitigating of the detected spark knock is performed by spark retardation.

* * * * *